United States Patent
Kim et al.

(10) Patent No.: US 10,175,370 B2
(45) Date of Patent: Jan. 8, 2019

(54) MARINELLI BEAKER CORRECTION CONTAINER FOR STABLE RADIONUCLIDE ANALYSIS

(71) Applicant: KOREA HYDRO & NUCLEAR POWER CO., LTD., Gyeongju-si, Gyeongsangbuk-do (KR)

(72) Inventors: Hee Sun Kim, Uijeongbu-si (KR); Mun Ja Kang, Daejeon (KR); Hoon Choi, Seoul (KR); Kwang Hee Yang, Seoul (KR); Hyunjin Joo, Seoul (KR)

(73) Assignee: Korea Hydro & Nuclear Power Co., Ltd., Gyeongju-si, Gyeongsangbuk-do (KR)

( * ) Notice: Subject to any disclaimer, the term of this patent is extended or adjusted under 35 U.S.C. 154(b) by 0 days.

(21) Appl. No.: 15/746,271

(22) PCT Filed: Aug. 4, 2015

(86) PCT No.: PCT/KR2015/008154
§ 371 (c)(1),
(2) Date: Jan. 19, 2018

(87) PCT Pub. No.: WO2017/014349
PCT Pub. Date: Jan. 26, 2017

(65) Prior Publication Data
US 2018/0210099 A1     Jul. 26, 2018

(30) Foreign Application Priority Data
Jul. 20, 2015 (KR) .................. 10-2015-0102368

(51) Int. Cl.
*G01T 7/02* (2006.01)
*G01T 1/167* (2006.01)
(Continued)

(52) U.S. Cl.
CPC ............... *G01T 7/02* (2013.01); *G01T 1/167* (2013.01); *G01T 7/00* (2013.01); *G21F 5/015* (2013.01)

(58) Field of Classification Search
CPC ... G01T 7/02; G01T 1/167; G01T 7/00; G21F 5/015
(Continued)

(56) References Cited

FOREIGN PATENT DOCUMENTS

| JP | 2013-088408 A | 5/2013 |
| JP | 2013-205057 A | 10/2013 |

(Continued)

OTHER PUBLICATIONS

Wang, et al ("HPGe Detector Efficiency Calibration for Extended Cylinder and Marinelli-beaker Sources using the ESOLAN Program" Elsevier Science Ltd, Appl. Radiat. Isot. vol. 48, No. 1, pp. 83-95, 1997).*

*Primary Examiner* — Michael Maskell
(74) *Attorney, Agent, or Firm* — Rabin & Berdo, P.C.

(57) ABSTRACT

Disclosed is a correction container of a Marinelli, wherein a first groove is formed in the lower portion of the container body formed with a diameter corresponding to the inner diameter of the lower surface of the Marinelli beaker, to be attached to a detector of a detecting system for nuclide analysis, a second groove having a diameter smaller than that of the first groove is formed on the upper portion, and an intake and exhaust hole is formed through the first groove to the second groove.
According to the present invention, a Marinelli beaker covers a upper portion of a container body to wrap around it, and a detector of a nuclide detecting device is inserted into a first groove formed in a lower portion of the container body. By means of the correction container according to the present invention, the distance between the position of
(Continued)

radionuclides in the sample in a Marinelli beaker and the detector is maintained constant. Accordingly, the reliability of the detection value in nuclide analysis is advantageously improved.

4 Claims, 4 Drawing Sheets

(51) Int. Cl.
    *G01T 7/00*     (2006.01)
    *G21F 5/015*     (2006.01)

(58) Field of Classification Search
    USPC ....................................................... 250/506.1
    See application file for complete search history.

(56) References Cited

FOREIGN PATENT DOCUMENTS

| | | |
|---|---|---|
| JP | 2014-085163 A | 5/2014 |
| KR | 10-1991-0017181 A | 11/1991 |
| KR | 20-0166575 Y1 | 2/2000 |
| KR | 10-0372755 B1 | 2/2003 |
| KR | 10-0875384 B1 | 12/2008 |

\* cited by examiner

MARINELLI BEAKER CORRECTION CONTAINER FOR STABLE RADIONUCLIDE ANALYSIS

TECHNICAL FIELD

The present invention relates to a correction container for binding between a Marinelli beaker and a detector of a detecting device for nuclide analysis, in particular to a Marinelli beaker correction container capable of fixing stably a Marinelli beaker or an 80 ml bottle for measuring sample on a detector of a detecting device.

BACKGROUND ART

In general, samples for radionuclide analysis have a variety of shapes, chemical and physical properties. The radiation level may be low in a large sample, or it may be high in a very small sample. In the case where the sample is composed of a material of a high density and a high atomic number, measurement by gamma ray attenuation may be difficult.

Accordingly, the sample should be mounted on the detector of the optimum condition in order that radiation spectrum can be obtained well along with reliable figures. On the other hand, in order to analyze the gamma ray emission nuclide existing in the sample, it is important how the gamma ray penetrates the substance and how the gamma ray shall be detected. High Purity Germanium Gamma Spectroscopy Systems (hereinafter referred to as "HPGe") which show efficiency at low energy and excellent resolution across the entire energy range is widely used to meet these requirements.

With the use of HPGe in Korea and other countries as described above, there have also been various types of Marinelli beakers (1 L) for charging samples so as to correspond to a detecting device installed. And since a new type of Marinelli beaker recently supplied has become larger by considering the diameter of the detecting device mounted on various HPGe products, a space is formed between the detecting device and the lower portion of the beaker where the detecting device is inserted, thereby increasing the uncertainty of the detection value. Accordingly, it is needed to develop a complementary container that can reduce the experimental error (geometrical uncertainty) occurring during mounting the sample by the space existing between the Marinelli beaker and the detecting device.

The above-mentioned experimental error can be expressed by the following standard uncertainty. That is, the combined standard uncertainty ($U_C$) is the standard uncertainty of the measurement result when the measurement result is obtained from several different input quantities and is obtained by combining the uncertainty ($U_A$) obtained by statistically analyzing a series of observed values and the uncertainty ($U_B$) by the mathematical method as in Equation 1 below when the uncertainty factor (input quantity) is independent.

In other words, by installing the correction container in the space existing on the lower portion of the Marinelli beaker where the detector is contacted, a calibration error that occurs during the equipment calibration as well as a standard deviation that occurs during the repeated experiment can be reduced, and this is related to statistics analytical uncertainty $U_A$.

$$U_c = \sqrt{U_a^2 + U_b^2}$$ [Equation 1]

In Equation 1, $U_C$ is the combined standard uncertainty, $U_A$ is the uncertainty by observation statistics, and $U_B$ is the uncertainty by a mathematical method.

On the other hand, the correction container must be replaced since the required size becomes different in order to measure radionuclides in a sample using the small amount of sample measuring bottle. In order to measure radionuclides in a small amount of sample, a small measuring bottle having a capacity of 80 ml should be used. In order to measure radionuclides using a small measuring bottle, the bottle must be fixed steady with the height kept constant from the surface of the HPGe detecting device. In the past, there was not a correction container for sealing the space existing on the surface of the lower portion of a Marinelli beaker where the detecting device is contacted or another particular device or instrument capable of fixing on the correction container by changing a small measuring bottle.

PRIOR ART DOCUMENTS

Patent Documents (Patent Document 1) 1. Korean Utility Model Registration No. 20-0166575 (published on Feb. 15, 2000)
(Patent Document 2) 2. Korean Patent No. 10-0372755 (published on Feb. 17, 2003)

DISCLOSURE

Technical Problem

The present invention provides a correction container capable of fixing stably a Marinelli beaker to a detecting device by sealing the space generated on the lower surface of the Marinelli beaker mounted on a nuclide detecting device.

In addition, the present invention is intended to provide a correction container capable of attaching to a small amount of sample measuring bottle having a capacity of 80 ml, thereby, stably fixing a container of a different size depending on a change in sample amount to a detecting device.

The present invention also provides a correction container capable of easily attaching and detaching a Marinelli beaker and a small amount of a sample measuring bottle having a capacity of 80 ml on a nuclide detecting device.

Technical Solution

In order to accomplish the above object, a correction container of a Marinelli beaker according to the present invention may include a container body which has been formed to have a diameter corresponding to an inner diameter of the recessed lower surface of a Marinelli beaker.

Preferably, in the container body according to the present invention, a first groove which is attached to a detector of a detecting system for nuclide analysis may be formed in a lower portion of the container body, a second groove having a smaller diameter than the first groove may be formed in a upper portion of the container body, and an intake and exhaust hole may be formed through the first groove to the second groove.

Preferably, the intake and exhaust hole formed in the container body may be provided with a length of 8 mm to 12 mm.

Preferably, the second groove formed in the upper portion of the container body may be formed with an inner diameter corresponding to the diameter of the lower surface of the sample measuring bottle having a capacity of 80 ml used in nuclide analysis.

Preferably, the container body according to the present invention may be made of a polyethylene resin.

Advantageous Effects

According to the present invention, a Marinelli beaker may cover a upper portion of a container body to wrap around it, and a detector of a nuclide detecting device is inserted into a first groove formed in a lower portion of the container body. By means of the correction container according to an embodiment of the present invention, the distance between the position of radionuclides in the sample in a Marinelli beaker and the detector is maintained constant. Accordingly, there is an advantage that the reliability of the detection value in nuclide analysis is improved.

In addition, according to an embodiment of the present invention advantageously the uncertainty of nuclide analysis is lowered by stably fixing a Marinelli beaker in nuclide analysis, and a beaker can be easily attached and detached by the intake and exhaust hole formed in the container body.

Further, in the present invention, when a small amount of 80 ml sample is to be analyzed, a second groove which a small container used is attached to is formed in the upper portion so that a small amount of sample measuring bottle having a capacity of 80 ml in addition to the Marinelli beaker can be stably fixed. Accordingly, there is an advantage that the nuclide test can be performed without replace with an extra correction container.

BEST MODE

Figure 1:
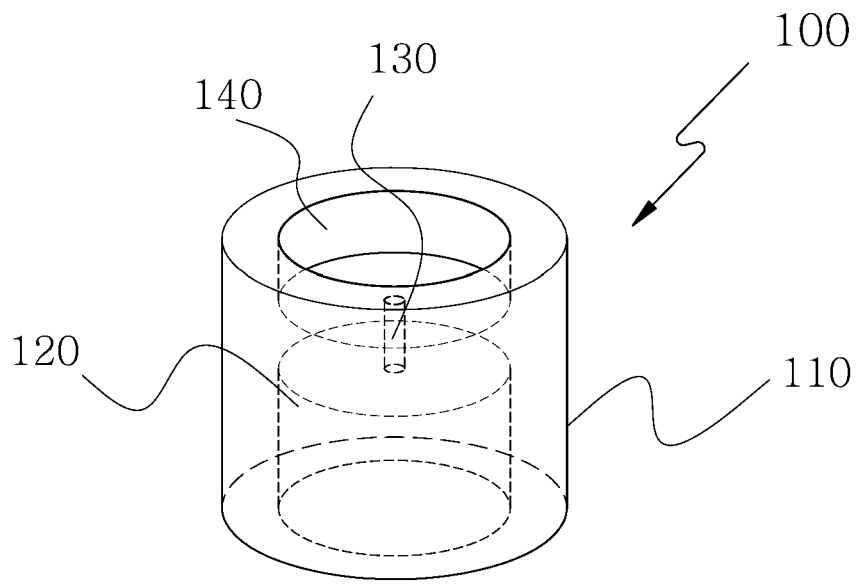
FIG. 1 is a perspective view of a correction container for a Marinelli beaker according to an embodiment of the present invention.

Hereinafter, the present invention will be described in detail with reference to the accompanying drawings. However, the present invention is not limited by the exemplary embodiments. Same reference numerals in the drawings denote members performing substantially the same function.

The objects and effects of the present invention can be understood or clarified naturally by the following description, and the objects and effects of the present invention are not limited only by the following description. In the following description, the detailed description regarding prior art related to the present invention, if it would obscure the gist of the present invention, shall be omitted.

Before describing the technique according to the present invention, the technical principle of the present invention for solving the problems of the conventional art will be summarized as in the following. First, in general a Marinelli beaker is commonly used for the analysis of gamma emitting radionuclides in samples such as foods. A sample is filled into a conventional Marinelli beaker in the form of a donut and is mounted on a gamma ray detector in a HPGe (High Purity Germanium Gamma Spectroscopy System) so that nuclide analysis can be performed.

However, since the diameters of detectors installed in HPGe produced by various companies are not uniform, Marinelli beakers which can be commonly used have recently been produced and started to be distributed. The detection uncertainty in the analysis is low when the contact area of the lower portion of the Marinelli beaker for installing the detector is matched with the diameter of the detector. However, since the contact area of the lower portion of the Marinelli beaker for installing the detector is larger than the diameter of the detector, the Marinelli beaker filled with the sample is unstably placed on the detector of the detecting device.

As described above, if the Marinelli beaker filled with the sample is not stably placed on the detector of the detecting device, the distance between the position of the radionuclide in the sample and the detector is also changed, thereby lowering the reliability of the detection value. In the present invention, the uncertainty in the nuclide analysis is lowered by sealing the space existing in the detector mounting of the lower portion of a new Marinelli beaker that models Coaxial HPGE Detector, GC 4019 in HPGe (7500SL) by Canberra, which is most widely used domestically.

On the other hand, a small measuring bottle should be used to measure radionuclides in a small amount of sample. In order to measure radionuclides in a sample using a small measuring bottle, the bottle must be fixed steady with the height kept constant from the surface of the HPGe detecting device. Depending on the amount of a sample for radionuclide analysis, the user will use either a Marinelli beaker or a sample measuring bottle with a capacity of 80 ml.

In the present invention, it is possible to stably fix a Marinelli beaker and a small amount of sample measuring bottle on a detector of a detecting device with one correction container, thereby reducing uncertainty in nuclide analysis. The configuration and overall operation principle of the present invention is described in detail as follows.

FIG. 1 is a perspective view of a Marinelli beaker correction container 100 according to an embodiment of the present invention. Referring to FIG. 1, a Marinelli beaker correction container 100 may comprise a container body 110 which is attached to a Marinelli beaker 20, FIG. 3 and a detector 10, FIG. 3 of the detecting device between them. In this embodiment, the container body 110 may be provided as a material of a polyethylene resin.

The container body 110 is inserted and seated in the lower portion of the Marinelli beaker 20, FIG. 3. Further, the container body 110 is coupled and mounted so as to surround the detector 10, FIG. 3 of the detecting device. The container body 110 is provided to bond the Marinelli beaker 20, FIG. 3 and the detector 10, FIG. 3 of the detecting device, which don't fit into each other.

When analyzing radionuclides in a small amount of sample, a sample measuring bottle 30, FIG. 3 of 80 ml smaller than the Marinelli beaker 20, FIG. 3 is used. The container body 110 according to the present embodiment can be inserted such that the Marinelli beaker 20, FIG. 3 of a large size wraps around its upper portion. And it is provided so a small amount of the sample measuring bottle 30, FIG. 3 can be inserted and seated on a second groove 140 formed on the upper portion.

The container body 110 is formed with a diameter corresponding to the inner diameter of the recessed lower surface 22, FIG. 3 of the Marinelli beaker 20, FIG. 3 so that the container body 110 can be inserted and fixed to the lower portion of the Marinelli beaker 20, FIG. 3. Accordingly, the container body 110 is attached to the inside of the lower portion of the Marinelli beaker 20, FIG. 3.

In the container body 110, a first groove 120, a second groove 140 and an intake and exhaust hole 130 are formed such that the detector 10, FIG. 3 and a small amount of the sample measuring bottle 30, FIG. 3 can be attached to the container body.

The first groove 120 may be formed at the lower portion of the container body 110 and may be attached to the detector 10 of the detecting device, FIG. 3 for analyzing nuclides. Accordingly, it is preferable that the inner diameter of the first groove 120 is formed to correspond to the diameter of the detector 10, FIG. 3. The lower surface of the container body 110 is recessed to a predetermined depth by the first groove 120.

The second groove 140 may be formed on the upper portion of the container body 110 with a smaller diameter than the first groove 120. When a small amount of radionuclide is analyzed, a sample measuring 80 ml bottle 40, FIG. 3 is generally used. In this case, a small amount of the sample measuring bottle 30, FIG. 3 is generally provided so that its diameter is designed to be smaller than the detector 10, FIG. 3.

The second groove 140 where a small amount of sample measuring bottle 30, FIG. 3 is seated is designed to have a smaller inner diameter than the diameter of the detector 10, FIG. 3 and the first groove 120. More preferably, the second groove 140 is provided with an inner diameter corresponding to the diameter of the lower surface of the 80 ml sample measuring bottle used in nuclide analysis. In this embodiment, the second groove 140 may be formed at a depth of 1 cm on the upper portion of the container body 110.

As the second groove 140 is formed on the upper portion of the container body 110, the container of a different size can be stably fixed to the detector 10 in FIG. 3 of the detecting device. First, since the diameter of the container body 110 corresponds to the inner diameter of the recessed lower surface 22, FIG. 3 of the Marinelli beaker 20, FIG. 3, the Marinelli beaker 20, FIG. 3 of a relatively large size may be attached to the container body 110 in such a way that the container body is enclosed with the Marinelli beaker. Secondly, a small amount of sample measuring bottle 30, FIG. 3 of a relatively small size may be inserted into the second groove 140 formed in the upper portion of the container body 110. Accordingly, it is possible to perform nuclide analysis according to the sample amount even without changing the correction container 100.

The first groove 120 and the second groove 140 are spaced apart from each other by a predetermined distance on the inner side of the container body 110. The spaced distance refers to the distance between a small amount of sample measuring bottle 30, FIG. 3 and the detector of the detecting device 10, FIG. 3, which can be suitably designed according to the experimental conditions of nuclide analysis.

The intake and exhaust hole 130 may be formed through the first groove 120 to the second groove 140. The intake and exhaust hole 130 may be formed through the center of the bottom surface of the second groove 140 to the center of the upper surface of the first groove 110. The intake and exhaust of the air through the intake and exhaust hole 130 happens such that the attachment and detachment can be made smoothly when the container body 110 is attached to or detached from the recessed lower surface 22, FIG. 3 of the Marinelli beaker of the beaker or a small amount of sample measuring bottle 30 is attached to or detached from the second groove 140.

The intake and exhaust hole 130 is used to exhaust the air pressure or intake the air by the vacuum pressure during attachment to/detachment from the Marinelli beaker 20, FIG. 3, a small amount of sample measuring bottle 30, FIG. 3 or the detector 10, FIG. 3. Accordingly, the Marinelli beaker 20, FIG. 3 or a small amount of sample measuring bottle 30, FIG. 3 can be easily attached to or detached from the container body 110, and the container body 110 can be easily attached to or detached from the detector 10, FIG. 3.

The length of the intake and exhaust hole 130 refers to a separation distance between the sample measuring bottle 30, FIG. 3 and the detector 10, FIG. 3. It is desirable to maintain a distance of 1 cm between the detector and the container when radionuclide analysis is performed for a small amount of sample. In this embodiment, the intake and exhaust hole 130 may be provided in a length of 8 mm to 12 mm. In this case, it is more preferable that the length of the intake and exhaust hole 130 is 10 mm.

Figure 2:
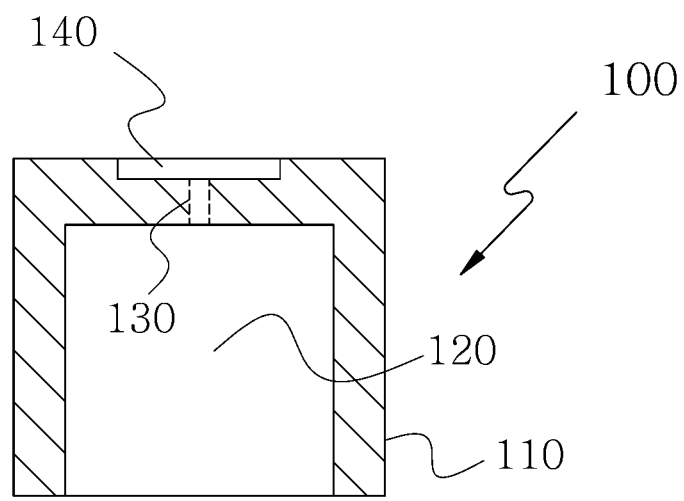
FIG. 2 a view of longitudinal section of a Marinelli beaker correction container according to the embodiment of FIG. 1.

FIG. 2 is a view of longitudinal section of a Marinelli beaker correction container 100 according to the embodiment of FIG. 1. Referring to FIG. 2, the first groove 120, the second groove 140, and the intake and exhaust hole 130 are formed on the container body 110 with different diameters. The container body 110 has a first groove 120 formed at a lower portion thereof to be attached to a detector 20 of the detecting device for nuclide analysis, a second groove 140 having a smaller diameter than the first groove 120 at a upper portion thereof, and the intake and exhaust hole 130 which is formed through the first groove 120 to the second groove 140.

The first groove 120 may be formed deeper than the second groove 140 so that the container body 110 can be stably fixed to the detector 20, FIG. 3. The vertical length of the container body 110 is preferably longer than the depth of the recessed lower surface 22, FIG. 3 of the Marinelli beaker.

Figure 3A:
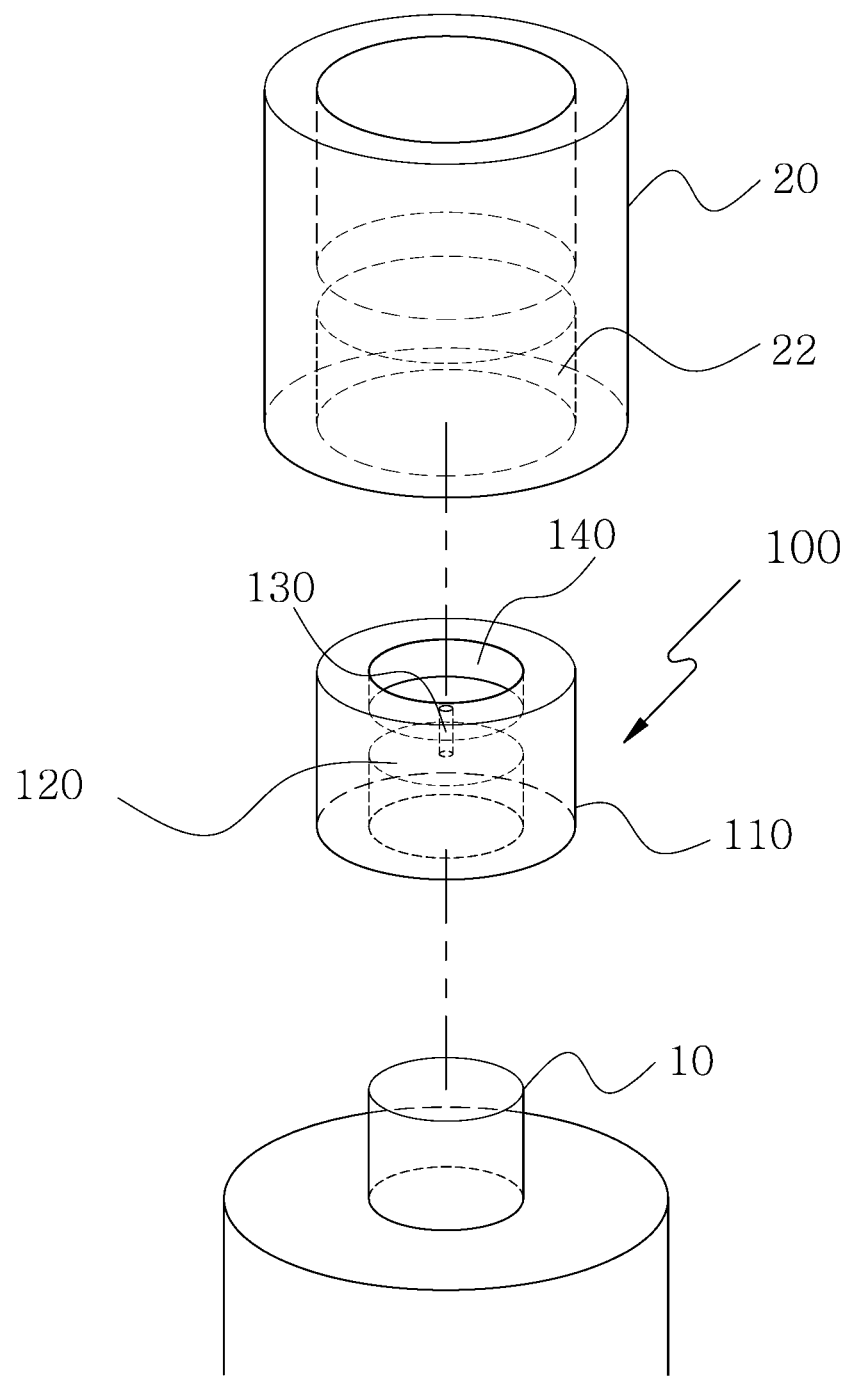
FIG. 3A is a perspective view of uninstalling a Marinelli beaker by a Marinelli beaker correction container according to an embodiment of the present invention.
Figure 3B:
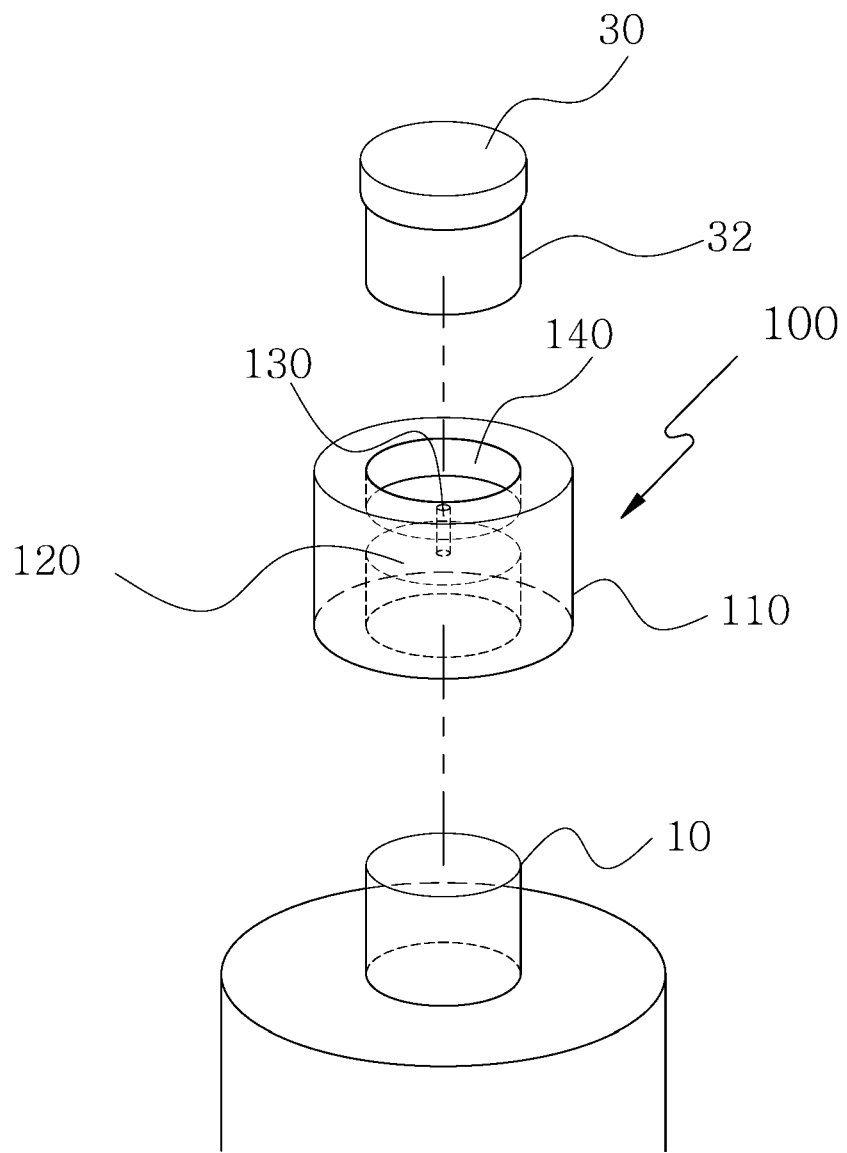
FIG. 3B is a perspective view of uninstalling a small-sized sample measuring bottle of 80 ml by a Marinelli beaker correction container.

FIG. 3A is a perspective view of uninstalling a Marinelli beaker by a Marinelli beaker correction container according to an embodiment of the present invention, and FIG. 3B is a perspective view of uninstalling a small amount of sample measuring bottle of 80 ml by a Marinelli beaker correction container. Referring to FIG. 3, it can be appreciated that different specifications, such as a Marinelli beaker 20 and a small amount of sample measuring bottle 30, can be fixed with a single correction container 100.

Figure 4:
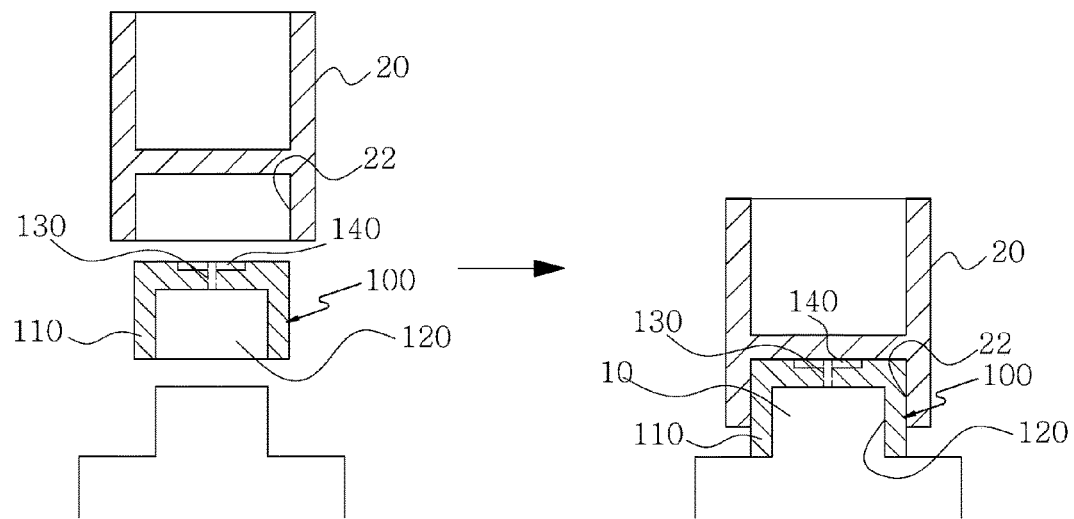
FIG. 4 shows the attachment and detachment of a Marinelli beaker according to the embodiment of FIG. 3A.
Figure 5:
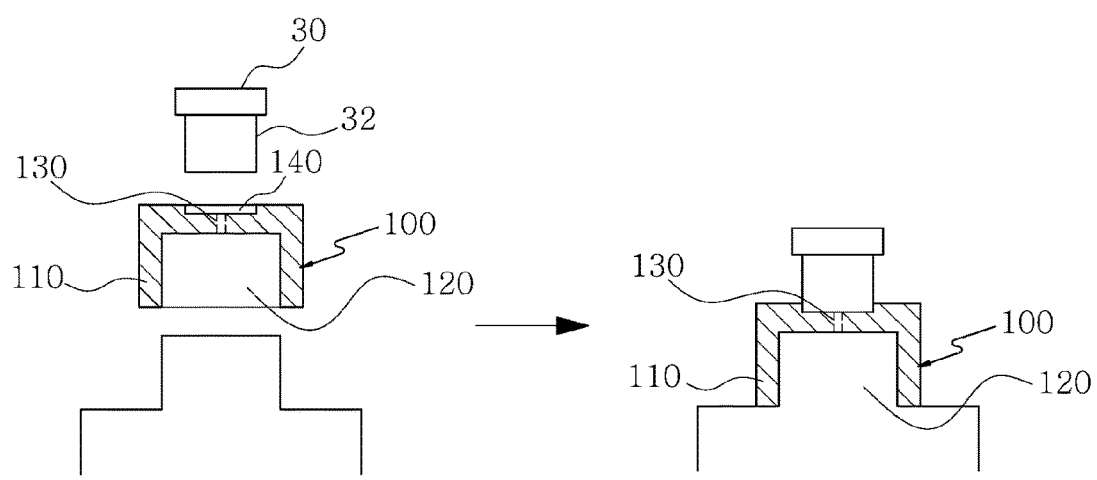
FIG. 5 shows the attachment and detachment of a sample measuring bottle having a capacity of 80 ml according to the embodiment of FIG. 3B.

FIG. 4 shows the attachment and detachment of a Marinelli beaker according to the embodiment of FIG. 3A. FIG. 5 shows the attachment and detachment of a sample measuring bottle having a capacity of 80 ml according to the embodiment of FIG. 3B.

Referring to FIGS. 1-5, the correction container 100 according to the present embodiment can allow a Marinelli beaker 20 made large in consideration of a diameter of a detector installed in various HPGe company products and a small amount of sample measuring bottle to be stably fixed to the detector 10 of the detecting device.

While the present invention has been described in detail with reference to exemplary embodiments thereof, it is to be understood by those who are skilled in the art that the invention is not limited to the disclosed exemplary embodiments. Therefore, the scope of the present invention should not be limited to the above-described embodiments, but should be determined by all changes or modifications derived from the scope of the accompanying claims and equivalents thereof.

DESCRIPTION OF THE REFERENCE NUMERALS IN THE DRAWINGS

10: detector of the detecting device

20: Marinelli beaker

22: recessed lower surface of a Marinelli beaker

30: a small amount of sample measuring bottle

32: lower surface of a small amount of sample measuring bottle

100: Marinelli beaker correction container

110: container body

120: first groove

130: intake and exhaust hole

140: second groove

What is claimed is:

1. A Marinelli beaker correction container comprising:
a body container which is formed to have a diameter corresponding to the inner diameter of a recessed lower surface of the Marinelli beaker,
wherein in the container body, a first groove which is attached to a detector of a detecting system for nuclide analysis is formed in a lower portion of the container body, a second groove having a smaller diameter than the first groove is formed in a upper portion of the container body, and an intake and exhaust hole is formed through the first groove to the second groove.

2. The Marinelli beaker correction container according to claim 1, wherein the intake and exhaust hole formed in the container body is provided with a length of 8 mm to 12 mm.

3. The Marinelli beaker correction container according to claim 1, wherein the second groove formed in the upper portion of the container body is formed with an inner diameter corresponding to the diameter of the lower surface of the sample measuring bottle having a capacity of 80 ml used in radionuclide analysis.

4. The Marinelli beaker correction container according to claim 1, wherein, when the container body is made of a polyethylene resin.

* * * * *